United States Patent Office 3,524,685
Patented Aug. 18, 1970

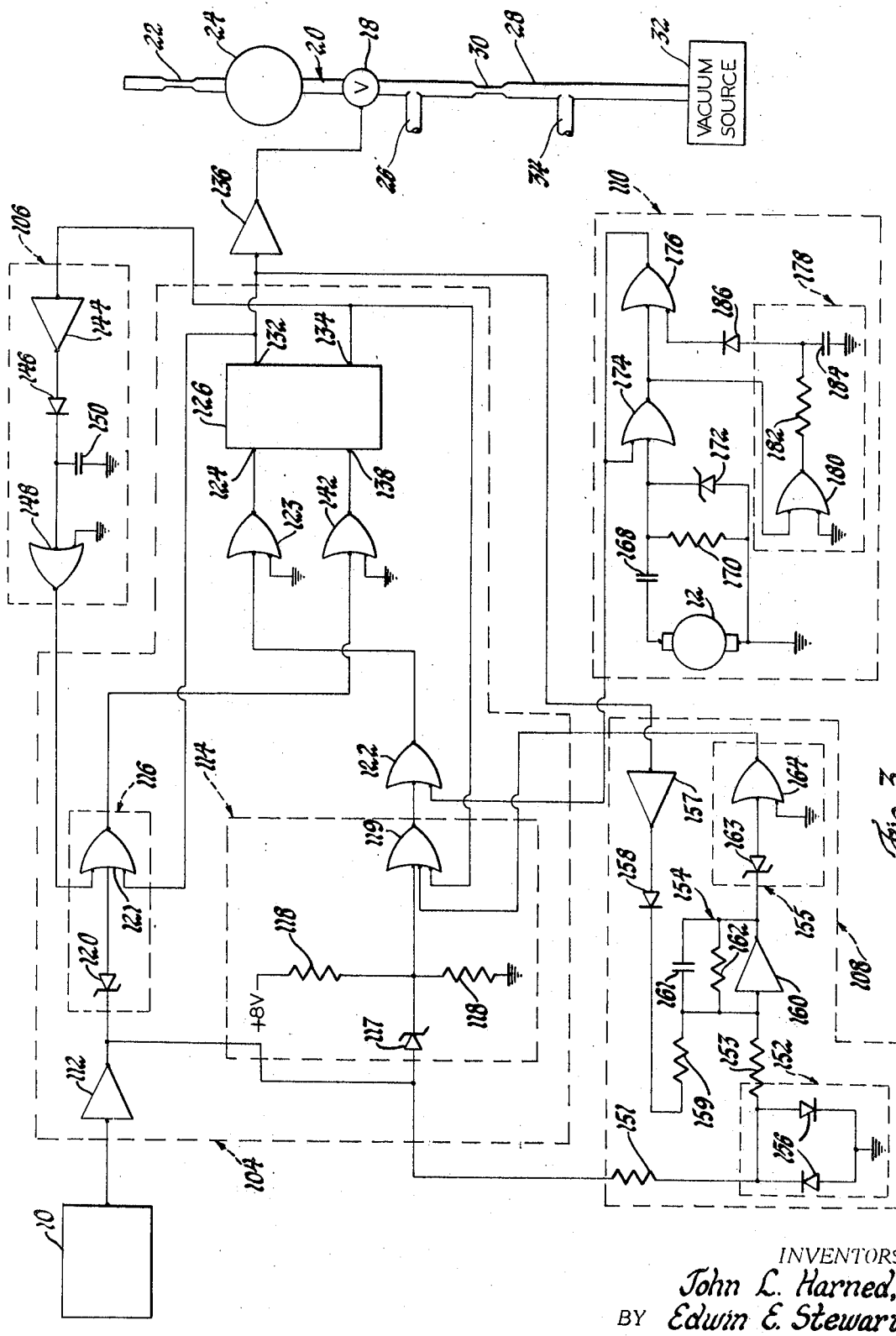

3,524,685
ANTILOCK BRAKE CONTROL SYSTEM
John L. Harned, Grosse Pointe Woods, and Edwin E. Stewart, Warren, Mich., assignors to General Motors Corporation, Detroit, Mich., a corporation of Delaware
Filed Aug. 9, 1968, Ser. No. 751,391
Int. Cl. B60t 8/08
U.S. Cl. 303—21                7 Claims

ABSTRACT OF THE DISCLOSURE

An electronic control incorporating solid state integrated circuits is responsive to wheel acceleration and velocity to produce signals for effecting alternating brake release and application to avoid wheel lock-up. Circuits are provided to compensate for spurious acceleration signals and for preventing wheel lock-up.

SPECIFICATION

This invention relates to an electronic control for a vehicle brake system of the type which maintains near optimum braking torque to avoid wheel lock-up.

In any sensitive electronic brake control system where it is necessary to sense velocity or acceleration of vehicle wheels, spurious signals occur due to transducer noise, the vehicle suspension characteristics, the effect of dynamic tire lag, the effect of hitting bumps and the like which may hinder the detection of the average or overall performance of the wheel. In addition, since a vehicle will encounter a wide range of road surfaces and other factors which influence brake response and effectiveness, a practical antilock brake control system, to be effective, must be sufficiently versatile to cope with all kinds of braking conditions and must not respond to spurious input signals.

While electronic circuits for antilock brake control systems are known, they do not, in general, respond to all braking conditions, nor do they take into account the possible effect of spurious signals. Further, they are not generally adapted to take advantage of the economies and compactness of solid state integrated circuits.

It is therefore an object of this invention to provide an electronic brake control which overcomes the disadvantages cited above.

It is a further object of this invention to provide an electronic control for a brake system in which circuitry is provided to avoid or reduce the effect of spurious wheel rotation conditions and spurious transducer signals.

It is another object of the invention to provide an electronic control for a brake system which incorporates an unique wheel lock-up reset concept to preventor overcome wheel lock-up.

An additional object of the invention is to provide a control for a brake system which is adapted to incorporate solid state integrated circuits.

The invention is carried out by providing in a brake control system an electronic control circuit responsive to wheel acceleration to produce signals calling for brake release and application, a circuit for preventing excessive periods of brake release, a further circuit responsive to acceleration for masking the effect of spurious acceleration signals, and a further circuit responsive to wheel velocity for sensing extraordinary velocity decrease rate to effect a brake release, the several circuits being combined and coordinated through a logic circuit. It is contemplated further that the invention be carried out by solid state integrated circuits.

The above and other advantages will be made more apparent from the following specification taken in conjunction with the accompanying drawings wherein like reference numerals refer to like parts and wherein:

FIG. 3 is a combined logic and schematic diagram of the circuit according to the invention.

Figure 1:
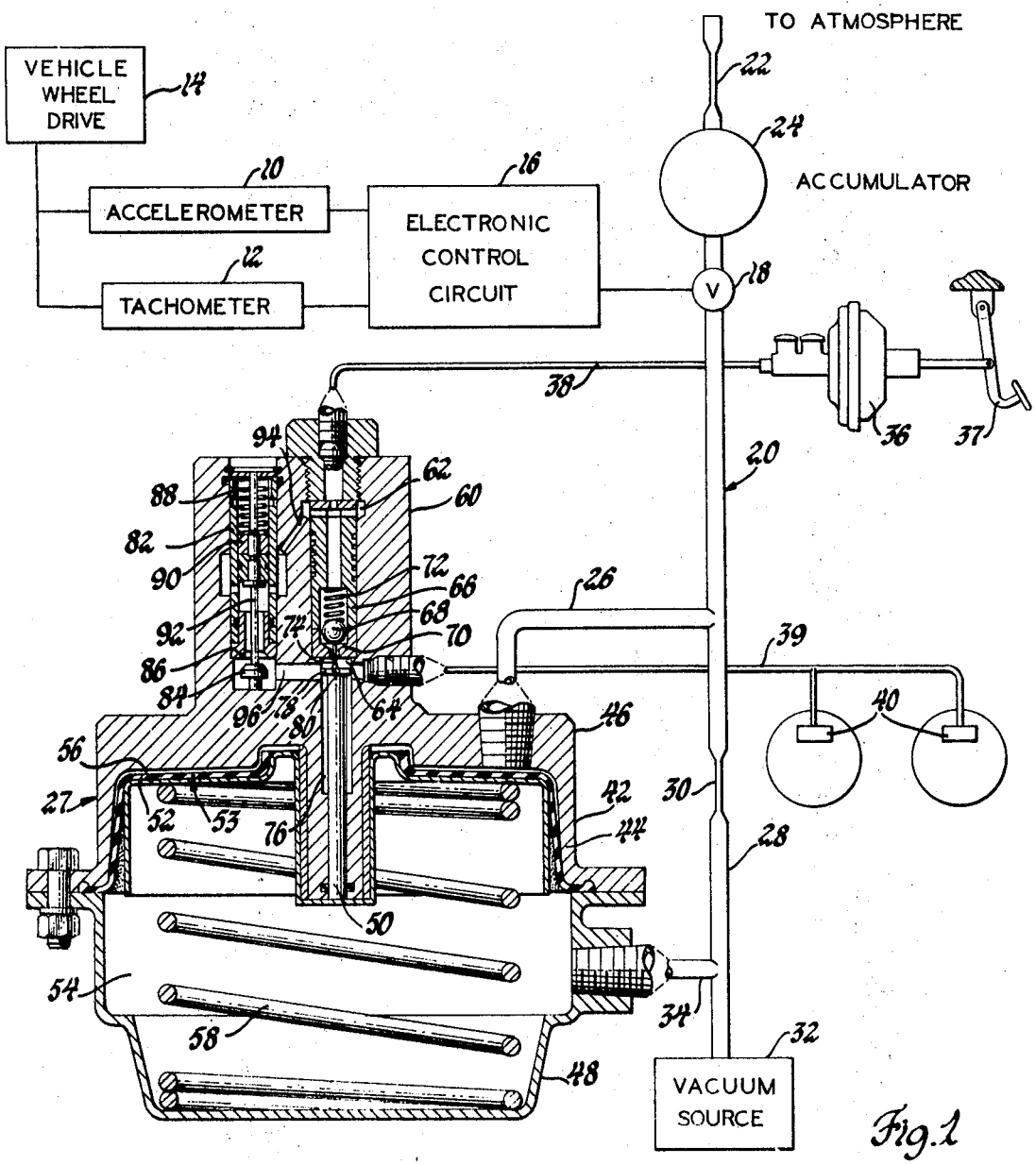
FIG. 1 is a schematic representation of a complete brake control system incorporating the circuit according to the invention.

Referring to FIG. 1, a pair of wheel rotation transducers comprising an accelerometer 10, preferably of the inertia type such as an angular servo-accelerometer available commercially as Schaevitz Engineering Model ASBG–16–500, and a tachometer 12 such as a DC tachometer generator, are mechanically driven by a vehicle wheel drive 14 which may be an individual wheel or a propeller shaft, for example, which drives a pair of wheels. The transducers 10 and 12 produce electrical signals which are proportional to wheel acceleration or deceleration and velocity. These signals are operated upon by an electronic control circuit 16 which produces an output signal calling for either brake application or release. The signal operates a solenoid valve 18 in a pneumatic circuit 20 on one side of the valve which is opened to atmosphere and contains an air flow restricting orifice 22 and an accumulator 24. On the other side of the valve 18, the pneumatic circuit 20 includes a passage 26 to one side of the brake pressure modulator 27 and another passage 28 containing a second air flow restricting orifice 30 serving as an apply rate orifice leading to a vacuum source 32, such as a vehicle engine manifold. A further passage 34 connects the vacuum source 32 to the other side of the brake pressure modulator 27. A conventional brake master cylinder 36 actuated by a manually operated brake pedal 37 is connected by a brake pressure conduit 38 to the modulator 27 and a brake line 39 extends from the modulator 27 to a pair of wheel brakes 40.

The brake pressure modulator 27 has a pneumatic section 42 which receives signals from the pneumatic circuit 20 and includes a housing 44 formed by an upper section 46 and a lower section 48. A piston 50 is positioned within the housing and cooperates with a diaphragm 52 to provide a power wall 53 which divides the housing 44 into a vacuum chamber 54 and a variable pressure chamber 56. Vacuum chamber 54 is connected to passage 34 so that the chamber 54 is always at the pressure found in the vacuum source 32. A power wall spring 58 is contained in the chamber 54 and urges the piston 50 and the diaphragm 52 in a direction tending to decrease the volume of the chamber 56. The chamber 56 is connected with the signal conduit 26 and therefore the pressure in the chamber 56 varies in accordance with the signals generated by the pneumatic circuit 20. In the normal condition of brake operation, the valve 18 is closed so that the pressure signal transmitted to the chamber 56 is also the vacuum supply pressure, and therefore the pressure forces are balanced across the diaphragm 52. This permits the compression spring 58 to hold the power wall 53 in the position shown in the drawing. The modulator assembly 27 further includes a hydraulic section 60 contained in the pneumatic housing 44 upper section 46. The hydraulic section 60 has an inlet chamber 62 fluid connected with brake pressure conduit 38. It also has an outlet chamber 64 fluid connected to the brake line 39. The chambers 62 and 64 are separated by a ball-type check valve 66 comprising a ball 68 urged toward a valve seat 70 by a coil spring 72. When the ball 68 is seated it prevents fluid from flowing between the chambers 62 and 64.

A fluid displaceable means in the form of piston 50 is reciprocably mounted in a portion of housing 46 so that it extends into outlet chamber 64. The upper end of piston 50 is provided with a pin 74 which extends through the valve seat 70 when in its uppermost position so that the pin 74 extends upwardly a sufficient distance to positively hold the ball 68 in an unseated position. The other end of the piston 50 extends through the housing 46 into the variable pressure chamber 56. The housing 46 contains a cylindrical relieved portion 76 surrounding the piston 50 and the piston carries an annular flange 78 sized to mate with the relieved portion of the housing 46. A small orifice 80 is provided in the flange 78 so that as the piston 50 travels relative to the housing 44, the flange 78 and the relieved portion 76 coact to form a dashpot for damping oscillations, the damping rate being dependent upon the size of the orifice 80 in the flange 78.

A bypass valve assembly 82 is included in the modulator to transmit a large amount of hydraulic fluid at low pressure to the brakes 40 during the initial part of the brake operation. The bypass valve assembly 82 includes a check valve 84 and a cooperating seat 86. The check valve 84 is biased to an open position by a spring 88 which acts on the check valve 84 through a piston assembly 90 and a connecting stem 92. A first passage 94 connects one side of the bypass valve assembly 82 to the inlet chamber 62 and a second passage 96 connects the other side of the bypass valve assembly 82 to the outlet chamber 64. When the brake pressure reaches a predetermined amount, preferably 100 p.s.i., the piston assembly 90 is forced upwardly by the pressure to close the check valve 84. Then, as long as the brake line pressure remains above that value, fluid flow occurs only through the check valve 66.

In the normal condition of brake operation, the position of the various elements of the modulator 27 are as shown in the drawing and the valve 18 in the pneumatic circuit 20 is closed. Thus the chambers 54 and 56 are at vacuum supply pressure and spring 58 is holding the power wall 53 in its upward position so that it positively urges the piston 50 upwardly with a sufficient force to hold the ball 68 in unseated position. When pressure rises in the conduit 38 fluid is free to flow through the bypass valve assembly 82 until the pressure reaches 100 p.s.i. and then the check valve 84 is closed. The inlet chamber 62 is still connected to the outlet chamber 64, the brake apply pressure received by the brakes 40 are those pressures generated in the master cylinder 36 and transmitted through the conduit 38. If then the electronic control circuit 16 causes the valve 18 to open, air from the accumulator 24 will flow via the passage 26 to the variable pressure chamber 56 causing the diaphragm 52 and the piston 50 to move downwardly thus allowing the ball 68 to seat, thereby isolating the inlet chamber 62 from the outlet chamber 64. Further downward movement of the piston 50 has the effect of enlarging the capacity of the outlet chamber 64 thereby relieving the pressure in the brake line 39 by an amount determined by the displacement of the piston 50. Similarly, the brake line pressure will increase if the piston 50 should move upwardly in response to appropriate signals from the pneumatic circuit 20. This latter event occurs when the electronic circuit 16 closes the valve 18 so that the passage 26 is isolated from atmospheric pressure and the air in chamber 56 flows through the orifice 30 at a controlled rate to the vacuum source 32 and the spring 58 is then able to move the diaphragm 52 and the piston 50 upwardly.

The purpose and general operation of this brake control system is best described with reference to the torque diagram of FIG. 2 wherein the solid line 100 depicts the characteristic tire torque as plotted against wheel slip. As is well known, the maximum tire torque occurs at a relatively small degree of wheel slip, the value of it depending, in main, upon the coefficient of friction between the tire and the road. When the brakes are applied, as in a panic stop, the brake torque increases above the tire torque, as shown by dotted lines 102 which indicate brake torque. This causes increased wheel slip, and simultaneously, rapid deceleration of the vehicle wheel. The deceleration is sensed by the electronic control circuit 16 and when it exceeds a preset value, the circuit 16 produces a signal calling for brake release. This signal opens the valve 18 in the pneumatic circuit 20. Air from the accumulator 24 rushes into the variable pressure chamber 56 to effect rapid release of brake pressure as reflected by the curve 102 between points $a$ and $b$ and when the accumulator 24 supply is exhausted slower release of brake pressure is effected by air entering through the release rate orifice 22 as reflected in FIG. 2 by curve 102 between the points $b$ and $c$. When the brake torque 102 falls below the tire torque curve 100, the wheel stops decelerating and begins to accelerate so that wheel slip lessens. When the electronic control 16 senses a preset value of acceleration, a brake apply signal is generated which effects the closing of the valve 18 so that air bleeds from the variable pressure chamber 56 through the apply rate orifice 30 to the vacuum source 32 thereby effecting a gradual increase of brake pressure which is indicated by the increasing curve 102 between points $c$ and $d$. It will be recognized that even though the modulator continues to increase brake pressure, wheel acceleration continues because the brake torque 102 is less than the tire torque 100 until the wheel slip is decreased to point $d$ where brake torque 102 and tire torque 100 are equal. Then the wheel will begin to decelerate and the cycle repeats. The system is so designed that the cycle frequency is several times per second, the exact frequency depending upon conditions such as the vehicle speed and the road coefficient of friction. In any event, the tire torque is maintained at a level near the peak of the tire torque curve 100 so that excessive wheel slip is avoided and efficient braking is effected.

The electronic control circuit 16, as shown in FIG. 3, includes an acceleration switching circuit 104, an unloading reset circuit 106, a mask circuit 108 and a wheel lock reset circuit 110.

ACCELERATION SWITCHING CIRCUIT

The acceleration switching circuit 104 basically comprises a pair of signal level detectors 114 and 116 which control the solenoid valve 18 through a logic circuit comprising an array of NOR gates which may, for example, be of the type MC903G. The acceleration switching circuit 104 has as its input the output of the accelerometer 10 which is amplified by an amplifier 112 and then fed to a pair of signal level detectors 114 and 116. The detector 114 comprises a Zener diode 117, a voltage dividing circuit 118 for providing a forward bias on the Zener diode 117 and a NOR gate 119 having an input connected to the Zener diode 117. The voltage dividing circuit 118 is connected between a +8-volt source and ground. When the difference between the forward bias voltage and the ouput voltage of amplifier 112 exceeds the breakdown voltage of the Zener diode 117, the Zener diode 117 will conduct allowing the input voltage to the NOR gate 119 to decrease as the output voltage of the amplifier 112 decreases. Thus if the Zener diode is type IN753 with a breakdown voltage of 6.2 volts, the NOR gate is type MC903G having a switch point of 0.7 volt, and the forward bias is 1 volt, switching of the NOR gate 119 occurs at an amplifier 112 output of −5.5 volts. Thus (ignoring other inputs to NOR gate 119) the detector 114 will produce a logic output which is off at any value of acceleration or a value of deceleration corresponding to less than −5.5 volts output of amplifier 112 and which is on at greater values of deceleration.

The detector 116 comprises a Zener diode 120 in series with a NOR gate 121 such that the gate 121 will switch at a predetermined value of acceleration. For example, using a Zener diode of the type IN751 having a breakdown voltage of 5.1 volts, the NOR gate 121 will turn off at an amplifier 112 output voltage of +5.8 volts and will be off at lower voltages. Hence the first detector 114 is normally off at zero acceleration and at positive acceleration values. When wheel deceleration exceeds a preselected deceleration set point, approximately —100 rad./sec.$^2$, the detector 114 output turns on. The output of the first detector 114 is fed serially to a series of two NOR gates, 122 and 123 so that disregarding other inputs to the NOR gates, when the first detector 114 turns on the NOR gate 123 turns on. The output of the NOR gate 123 is fed to the set input 124 of a flip-flop circuit 126. When an on signal is fed to the set input 124, the first output 132 is on, the valve 18 is switched to closed and the second output 134 will be on. The first output 132 controls the valve 18 in the pneumatic system 20 by means of a driver amplifier 136. When the first output 132 of the flip-flop circuit 126 is off, the valve 18 is switched to open positon or brake release position, and when the first output 132 is on, the valve 18 is switch to closed or apply position.

The second signal level detector 116 is normally on at zero acceleration and at deceleration, but when the wheel exceeds a preselected set acceleration point, corresponding to approximately +120 rad./sec.$^2$, it switches off. The output of the detector 116 is fed to the reset input 138 of the flip-flop circuit 126 by way of a NOR gate 142 so that when the output of the second detector 116 is off, an on signal will be fed to the reset input 138 of the flip-flop 126 and the second flip-flop output 134 will be off. Then the first output will be on to switch the valve 18 to closed position, thereby calling for brake application. The first flip-flop output 132 is connected to the input of the NOR gate 121 to form a holding circuit so that output 132 will remain on, even though the acceleration signal decreases below the acceleration set point. The second output 134 of the flip-flop circuit is connected to an input of the NOR gate 119, to turn off the output of the NOR gate 119 shortly after it is turned on.

Starting from a condition of zero acceleration, if the brakes are applied hard enough to cause deceleration beyond the deceleration set point, the first detector 114 will produce an on output and the second detector 116 will already have had an on output. The flip-flop circuit 126 will then be set so that the first output 132 is off and brake release is effected. At the same time, of course, the second output 134 will be on and the feedback therefrom to the NOR gate 119 will turn off the signal to the set input 124 of the flip-flop. However, the flip-flop circuit 126 will not change state until an on signal is fed to the reset input 138. When the wheel acceleration resulting from the brake release reaches the acceleration set point, the second detector 116 will turn off to provide an on signal to the flip-flop circuit 126 reset input 138 thereby causing the first output 132 to turn on and the second output 134 to turn off, effecting brake application. The feedback signal from the first output 132 of the flip-flop to the NOR gate 121 will maintain the first output 132 on even though the acceleration decreases below the acceleration set point. Hence, the brakes will remain applied until the deceleration reaches the deceleration set point and the set input 124 of the flip-flop circuit 126 again receives an on signal.

Figure 2:
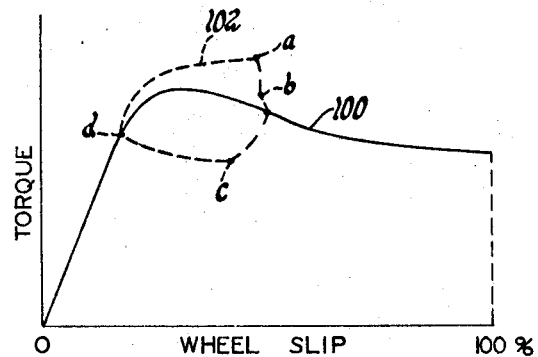
FIG. 2 is a brake-torque diagram.

With this circuit, then, the brake torque will cycle about the optimum tire torque as shown in FIG. 2, provided, however, that the vehicle operation occurs under ideal conditions with smooth acceleration and deceleration. However, under typical operating conditions, many erratic acceleration signals are produced which render this circuit inadequate to achieve optimum braking effort. Additional control circuits are provided to compensate for such erratic behavior.

UNLOADING RESET CIRCUIT

If the acceleration switch 104 improperly calls for brake release due to noise or some other spurious input or if the switch did not respond to the acceleration signals greater than the acceleration set point due to noise or other disturbances, brake release would take place until the wheel rolled unbraked. An unloading reset circuit 106 is provided to prevent such an undesired event. It has been found that the acceleration switch 104 is in the release mode for a short portion of the total cycle time, approximately .025 second. The unloading reset circuit 106 includes a timer circuit which senses the elapsed time of release and if this length of times reaches about .050 second, it produces a signal at the input of the logic circuitry to force the switch 18 into the apply mode.

The unloading reset circuit 106 comprises a buffer amplifier 144 such as type MC900G having its input connected to the second output 134 of the flip-flop circuit 126. This amplifier 144 has an on output when its input is off. The output of the amplifier 144 is connected serially to the input of the NOR gate 121 through a solid state diode 146 and a NOR gate 148. A capacitor 150 is connected between the junction of the diode 146 and the NOR gate 148 and ground. When the acceleration switching circuit 104 is in the apply mode, the second output 134 of the flip-flop circuit 126 is off, the buffer amplifier 144 output is on and the capacitor 150 becomes charged to a voltage level sufficient to maintain the NOR gate 148 output off. When the acceleration switch 104 changes to the release mode, the second output 134 of the flip-flop turns on, the buffer amplifier 144 turns off and the capacitor 146 slowly discharges through the input resistance of the NOR gate 148 and its voltage decreases at such a rate that after 0.05 second, the NOR gate 148 output turns on, thereby turning off the NOR gate 121 and turning on the NOR gate 141 at the reset input 138 of the flip-flop to change the acceleration switch to apply mode. The diode 146 allows rapid charging of the capacitor 150 by the amplifier 144 but prevents discharge of the capacitor through amplifier 144. Thus, if accelerometer noise causes a premature opening of the valve 18, or electrical failure occurs in a portion of the control unit or the accelerometer 10 malfunctions, it is assured that after 0.050 second of release time, the brakes will be applied. With the acceleration switch 104 now in the apply mode, the signal to the unloading reset circuit 106 disappears and the unloading reset circuit 106 resets so that it is ready to time the next release cycle. Another feature of the unloading reset circuit 106 is that since the acceleration switch 104 can be in either the apply or release mode when the electronic control circuit is first energized, the unloading reset circuit assures that the acceleration switch will be in the apply mode within 0.050 second after start-up. That is, if the second otuput 134 is on when the control circuit is first energized the buffer amplifier 144 will be off, and the output of the NOR gate 148 will be on to turn on the first output 132, thereby switching the acceleration switching circuit to the apply mode. If initially the first output 132 is on, the unloading reset circuit 106 will have no effect.

MASK CIRCUIT

During the apply mode, improper switching may occur due to hitting bumps, effects of dynamic tire lag, accelerometer noise or other causes. These spurious signals could cause improper switching from apply to release mode. A mask circuit 108 is provided to disable the first detector 114 by inhibiting the operation of the NOR gate 119 during a portion of each apply cycle. The length of time that the mask or inhibiting signal remains on is determined by the net amount of wheel deceleration time. The mask circuit accumulates time while the wheel is decelerating and subtracts from this accumulated time if the wheel should accelerate. When approximately 0.035 second of net deceleration time has been accumulated, the mask is removed, allowing the first detector 114 to control the logic circuit.

The mask circuit 108 compirses a voltage limiter 152 connected to the accelerometer 10 output through an isolating resistor 151. The limiter 152, in turn, is connected serially to an input resistor 153, an integrator 154, a third signal level detector 155, the output of which is fed to the input of the NOR gate 119. A buffer amplifier 157 such as type MC900G in series with a blocking diode 158 and an input resistor 159 connects the first output 132 of the flip-flop circuit 126 to the integrator 154. The buffer amplifier 157 has an on output when its input is off. The voltage limiter comprises a pair of diodes 156 connected in parallel with opposite polarities between the isolating resistor 151 and ground so that the output thereof fed to the integrator 154 will be a voltage of constant absolute value but having a polarity dependent upon whether the input signal represents acceleration or deceleration. The integrator 154 comprises an operational amplifier 160 in parallel with the integrating capacitor 161 and a filtering resistor 162. The detector 155 comprises a Zener diode 163 in series with a NOR gate 164, so that when the integrator 154 output voltage minus the Zener diode 163 voltage drop equals the switching voltage of the NOR gate 164 the NOR gate output will turn off if the voltage is increasing or will turn on if the voltage is decreasing.

In operation, it is desired that during the brake apply mode of the acceleration switching circuit 104, an on signal from the detector 155 be fed to the NOR gate 119 for a predetermined period of net deceleration to prevent brake release. When the acceleration switching circuit 104 switches to the release mode, the first output 132 of the flip-flop circuit 126 turns off and the buffer amplifier 157 output turns on and rapidly drives the integrator 154 to negative saturation. The output of the detector 155 then turns on, thereby providing an on mask signal at the input of the NOR gate 119 which prevents the NOR gate 119 from being operated by a deceleration signal from the amplifier 112. When the acceleration switching circuit 104 later switches to apply mode, deceleration signals will be applied to the mask circuit 108 through resistor 151 and since signals at the limiter 152 output are of constant absolute value, integrator 154 output voltage increases at a constant rate in the positive direction, but when spurious acceleration signals are received, then the integrator 154 output decreases at the same constant rate so that the integrator 154 output voltage will be a function of the net amount of deceleration time. The component values are so selected that when the net deceleration time reaches 0.035 second, the integrator 154 output voltage is sufficient to turn off the detector 155 output, thus removing the mask signal from the NOR gate 119 and allowing the detector 114 to respond to deceleration signals from amplifier 112.

WHEEL LOCK RESET CIRCUIT

If, during a panic brake stop the wheel rolls from a high to a low coefficient of friction surface, the change in surface causes an instantaneous decrease in tire torque so that the wheel tends to decelerate rapidly. While the resulting large deceleration signal would cause the valve 18 to open, the unloading reset circuit 106 would cause the valve 18 to close after 0.050 second and cause brake torque to increase. This time interval is not long enough to decrease brake torque and allow the wheel to accelerate to a nearly free rolling speed on the low coefficient surface. Consequently, a wheel lock reset circuit 110 is provided to override the unloading reset signal and maintain the valve 18 open for approximately 0.5 second. The wheel lock reset circuit 110 includes a wheel tachometer 12, means to sense a rapid decrease in velocity, means to produce an output signal and timing means to maintain this signal. The tachometer 12 produces a negative DC voltage proportional to wheel speed. The negative terminal of the tachometer 12 is connected through a capacitor 168 and a resistor 170 to the grounded pole of the tachometer 12. A Zener diode 172 is connected across the resistor 170. The capacitor 168 is connected to a pair of NOR gates 174 and 176 in series, and the output of NOR gate 176 comprises a wheel lock reset signal which is fed to the input of the NOR gate 122. The wheel lock reset signal is also fed back to an input of the NOR gate 174 to form a holding circuit. The output of the NOR gate 174 is fed to a timing circuit 178 comprising a NOR gate 180 in series with a resistor 182, the resistor 182 being connected by a capacitor 184 to ground and further being connected by a diode 186 to the input of the NOR gate 176. In the event of ordinary decelerations of the wheel, the tachometer 12 output varies relatively slowly so that the capacitor 168 voltage can follow. That is, the capacitor 168 can charge and discharge slowly through the resistor 170 without producing a large voltage drop across the resistor 170. When, however, a rapid deceleration occurs, the capacitor 168 discharges rapidly through the resistor 170 thereby generating a voltage high enough to turn off the NOR gate 174. The Zener diode 172 limits the voltage to a safe value by conducting at excessive voltages to bypass a portion of the current around the resistor 170. The off output of the NOR gate 174 will then turn on the NOR gate 176 and the holding circuit to the input of the NOR gate 174 maintains this condition. The resulting wheel lock reset signal fed to the NOR gate 122 turns off the NOR gate 122 to turn on the NOR gate 123 so that the set input 124 of the flip-flop circuit 126 is held on to maintain the valve 18 open. As the NOR gate 174 turns off, the NOR gate 180 turns on to charge the capacitor 184 through the resistor 182. After about 0.5 second, the capacitor charges to a level sufficient to turn off the NOR gate 176 so that the wheel lock reset signal is removed. This time of brake release is adequate for permitting the wheel to accelerate to a nearly free rolling speed. At that time, the acceleration switching circuit 104 is free to take over as before.

It will thus be seen that the electronic control circuit, particularly when used in conjunction with an appropriate brake pressure modulator system, provides effective brake control to prevent vehicle wheel lock-up, and further to maintain the brake torque near the optimum value of tire torque. Spurious acceleration signals do not degrade the system performance and further the system accommodates varying road surface conditions. Since the circuitry is specifically adapted to solid state integrated circuits it can be made compact and economical to build.

The embodiment of the invention described herein is for purposes of illustration and the scope of the invention is intended to be limited only by the following claims:

It is claimed:

1. In a brake control system having modulation means responsive to electrical control signals for applying and releasing brake pressure, electronic control means for controlling the modulation means by supplying electrical apply and release control signals thereto to call for brake apply and release, the electronic control means including:
   an accelerometer responsive to wheel acceleration and deceleration for producing an electrical output signal proportional thereto,
   acceleration switching circuitry including detector means responsive to the accelerometer output signal for sensing predetermined values of acceleration and deceleration and circuit means connected with said detector means for producing the said electrical control signals,
   unloading reset means including timer means connected to said circuit means and responsive to the output thereof for terminating any release signal after a predetermined time,
   a mask circuit means connected to the acceleration switching circuitry and responsive to the accelerometer output signals and to the electrical control signals for preventing a release control signal until the time of acceleration exceeds the time of acceleration by a predetermined net amount, and
   wheel lock reset means including a tachometer for sensing wheel velocity, means in circuit with the tachometer for sensing rate of change of velocity and a timing circuit responsive to the rate of change of velocity having its output connected to the circuit means for effecting a brake release signal for a predetermined time when the rate of change of velocity becomes large.

2. In a brake control system having modulation means responsive to electrical control signals for applying and releasing brake pressure, electronic control means for controlling the modulation means by supplying electrical apply and release control signals thereto to call for brake apply and release, the electronic control means including:
 an accelerometer responsive to wheel acceleration and deceleration for producing an electrical output signal proportional thereto, and
 acceleration switching circuitry including:
  a first signal level detector means connected to said accelerometer for producing an output at a preset value of deceleration,
  a second signal level detector means connected to said accelerometer for producing an output at a preset value of acceleration, and
  circuit means connected to both detector means and responsive to the ouputs thereof for producing a release control signal when the deceleration exceeds the preset amount of deceleration and an apply control signal when the acceleration exceeds the preset amount of acceleration,
 whereby the modulation means applies and releases brake pressure as a function of wheel acceleration and deceleration.

3. In a brake control system having modulation means responsive to electrical control signals for applying and releasing brake pressure, electronic control means for controlling the modulation means by supplying electrical apply and release control signals thereto to call for brake apply and release, the electronic control means including:
 an accelerometer responsive to wheel acceleration and deceleration for producing an electrical output signal proportional thereto,
 acceleration switching circuitry including detector means responsive to the accelerometer output signal for sensing predetermined values of acceleration and deceleration and logic circuit means connected with said detector means for producing the said electrical control signals, and
 reset means for limiting the time of the release signal comprising a timer circuit having its input connected to the output of the said logic circuit so that the timer circuit is energized when the release signal is initiated, the timer circuit having its output connected to the input of said logic circuit and including means to produce a reset output signal for terminating the release signal a predetermined time after the release signal is initiated.

4. In a brake control system having modulation means responsive to electrical control signals for applying and releasing brake pressure, electronic control means for controlling the modulation means by supplying electrical apply and release control signals thereto to call for brake apply and release, the electronic control means including:
 an accelerometer responsive to wheel acceleration and deceleration for producing an electrical output signal proportional thereto
 acceleration switching circuitry including detector means responsive to the accelerometer output signal for sensing predetermined values of acceleration and deceleration and logic circuit means connected with said detector means for producing the said electrical control signals, and
 means operative during periods of brake application for preventing spurious acceleration signals from effecting brake release comprising a mask circuit having one input connected to the output of the logic circuit and energized by the apply signal and another input connected to the accelerometer output, including means responsive to the accelerometer output signal for producing an output signal when the time of deceleration minus the time of acceleration is less than a predetermined net amount, and output means feeding the said output signal to the input of the logic circuit for inhibiting a release control signal.

5. In a brake control system having modulation means responsive to electrical control signals for applying and releasing brake pressure, electronic control means for controlling the modulation means by supplying electrical apply and release control signals thereto to call for brake apply and release, the electronic control means including:
 an accelerometer responsive to wheel acceleration and deceleration for producing an electrical output signal proportional thereto,
 acceleration switching circuitry for producing the said electrical control signals including means responsive to the accelerometer output signal for sensing predetermined values of acceleration and deceleration, means operative during periods of brake application for preventing spurious acceleration signals from effecting brake release comprising a mask circuit having one input connected to the output of the logic circuit and energized by the apply signal and another input means connected to the accelerometer output, including voltage limiter means operating on the accelerometer output signal for producing a modified accelerometer signal of substantially constant voltage value and opposite polarities for acceleration and deceleration, integrator circuit means connected to the voltage limiter means and responsive to the modified accelerometer signal for determining the net time of deceleration and for producing an inhibiting signal when the net time of deceleration is less than a predetermined value, the inhibiting signal being fed to the acceleration switching circuitry to inhibit a release control signal.

6. In a brake control system having modulation means responsive to electrical control signals for applying and releasing brake pressure, electronic control means for controlling the modulation means by supplying electrical apply and release control signals thereto to call for brake apply and release, the electronic control means including:
 an accelerometer responsive to wheel acceleration and deceleration for producing an electrical output signal proportional thereto,
 acceleration switching circuitry including detector means responsive to the accelerometer output signal for sensing predetermined values of acceleration and deceleration and logic circuit means connected with said detector means for producing the said electrical control signals,
 means responsive to wheel velocity for effecting a brake release signal comprising means for sensing wheel velocity and producing an electrical velocity signal proportional thereto,
 means for sensing wheel lock-up comprising circuit means responsive to a rapid decrease in the velocity signal for producing an output signal, holding circuit means for sustaining the output signal, and timer means for terminating the output signal after a predetermined duration, the output signal being fed to the logic circuit to effect a brake release control signal.

7. In a brake control system having modulation means responsive to electrical control signals for applying and releasing brake pressure, electronic control means for controlling the modulation means by supplying electrical apply and release control signals thereto to call for brake apply and release, the electronic control means including:
 an accelerometer responsive to wheel acceleration and deceleration for producing an electrical output signal proportional thereto, and acceleration switching circuitry including:
- a first signal level detector means connected to said accelerometer for producing an output at a preset value of deceleration,
- a second signal level detector means connected to said accelerometer for producing an output at a preset value of acceleration, and
- a logic circuit connected to both detector means and responsive to the outputs thereof for producing a release control signal when the deceleration exceeds the preset value and an apply control signal when the acceleration exceeds the preset value, whereby the modulation means applies and releases brake pressure as a function of wheel acceleration and deceleration, unloading reset means including timer means connected to said logic circuit and responsive to the output thereof for producing an output for terminating the release signal after a predetermined time, a mask circuit connected to the acceleration switching circuitry and responsive to the accelerometer output signals and to an electrical control signal for producing an inhibit signal to prevent a release control signal until the time of deceleration exceeds the time of acceleration by a predetermined net amount, and wheel lock reset means including a tachometer for sensing wheel velocity, means in circuit with the tachometer for sensing rate of velocity change and a timing circuit responsive to the rate of velocity change having its output connected to the logic circuit for effecting a brake release signal for a predetermined time when the wheel velocity decreases at a rapid rate, the first signal level detector means including a NOR gate responsive to the accelerometer output, the inhibit signal from the mask circuit and the release control signal, the second signal level detector means including a NOR gate responsive to the accelerometer output, the output of the unloading reset means, and the apply control signal, said logic circuit including a flip-flop circuit for producing the apply control signal and the release control signal, the flip-flop circuit having one input responsive to the output of the first detector, a NOR gate serially connected between the first detector and the one input of the flip-flop circuit and being responsive to the output of the wheel lock reset means, and the flip-flop circuit having another input responsive to the output of the second detector, whereby the logic circuit and the detector interconnect and coordinate the subcircuits comprising the control means.

References Cited

UNITED STATES PATENTS

| | | | |
|---|---|---|---|
| 3,026,148 | 3/1962 | Ruof | 303—21 |
| 3,338,637 | 8/1967 | Harned et al. | 303—21 |
| 3,362,757 | 1/1968 | Marcheron | 303—21 |

DUANE A. REGER, Primary Examiner

U.S. Cl. X.R.

303—20

PO-1050
(5/69)

UNITED STATES PATENT OFFICE
CERTIFICATE OF CORRECTION

Patent No. 3,524,685          Dated August 18, 1970

Inventor(s) John L. Harned and Edwin E. Stewart

It is certified that error appears in the above-identified patent and that said Letters Patent are hereby corrected as shown below:

In Column 1, line 52, "preventor" should read -- prevent or --; In Column 5, line 10, delete "is on, the valve 18 is switched to closed" and insert therefor -- of the flip-flop circuit 126 will be off --; In Column 5, line 15, "positon" should read -- position --; In Column 5, line 16, "switch" should read -- switched --.

SIGNED AND
SEALED
DEC 8 - 1970

(SEAL)
Attest:

Edward M. Fletcher, Jr.

Attesting Officer

WILLIAM E. SCHUYLER, JR.
Commissioner of Patents